United States Patent [19]

Kim

[11] Patent Number: 5,704,023
[45] Date of Patent: Dec. 30, 1997

[54] METHOD FOR INTERFACING ELECTRICAL SIGNALS TRANSMITTED BETWEEN AN ENGINE CONTROLLER AND A VIDEO CONTROLLER

[75] Inventor: Gyung-Yeol Kim, Seongnam, Rep. of Korea

[73] Assignee: SamSung Electronics Co., Ltd., Kyungki-do, Rep. of Korea

[21] Appl. No.: 551,815

[22] Filed: Nov. 7, 1995

[30] Foreign Application Priority Data

Nov. 9, 1994 [KR] Rep. of Korea ............ 29368/1994

[51] Int. Cl.$^6$ .................................................. G06F 15/00
[52] U.S. Cl. .................................. 395/114; 395/113
[58] Field of Search .................. 395/101, 106, 395/109, 111, 112, 113, 114, 520, 328, 800; 358/400, 401, 442, 448, 436; 347/50, 101, 104; 355/78, 88, 89; 364/130

[56] References Cited

U.S. PATENT DOCUMENTS

| | | | |
|---|---|---|---|
| 5,157,761 | 10/1992 | Hawkes | 395/107 |
| 5,287,020 | 2/1994 | Kimura et al. | 327/18 |
| 5,430,554 | 7/1995 | Konakai | 358/409 |
| 5,455,603 | 10/1995 | Hori et al. | 346/134 |
| 5,511,149 | 4/1996 | Hayano | 345/112 |
| 5,528,346 | 6/1996 | Kim et al. | 399/33 |
| 5,610,724 | 3/1997 | Kaneuo et al. | 358/400 |

FOREIGN PATENT DOCUMENTS 0501489 2/1992 European Pat. Off. .

Primary Examiner—Joseph Mancuso
Assistant Examiner—Gabriel I. Garcia
Attorney, Agent, or Firm—Robert E. Bushnell, Esq.

[57] ABSTRACT

A method for interfacing electrical signals transmitted between an engine controller and a video controller through first and second transmission lines in an image forming apparatus includes the steps of: transmitting first data indicating an engine power ready state from the engine controller to the video controller through the first transmission line when power is initially supplied to the engine controller, transmitting second data representive of a print ready state from the engine controller to the video controller through the first transmission line after performing a warm up operation on the image forming apparatus, transmitting third data representing commencement of a printing operation from the video controller to the engine controller through the second transmission line in response to an input of printing data to the video controller from an external source, transmitting fourth data representative of a request for page synchronization information from the engine controller to the video controller through the first transmission line in response to receipt of the third data by the engine controller, and transmitting fifth data representative of the page synchronization information from the video controller to the engine controller through the second transmission line in response to receipt of the fourth data by the video controller. The engine controller performs the printing operation in response to the fifth data.

16 Claims, 3 Drawing Sheets

METHOD FOR INTERFACING ELECTRICAL SIGNALS TRANSMITTED BETWEEN AN ENGINE CONTROLLER AND A VIDEO CONTROLLER

CROSS-REFERENCE TO RELATED APPLICATIONS

This application makes reference to, incorporates the same herein, and claims all benefits accruing under 35 U.S.C. §119 from an application for *Interfacing Method Of An Image Forming Apparatus* earlier filed in the Korean Industrial Property Office on 9 Nov. 1994 and there assigned Ser. No. 29368/1994.

BACKGROUND OF THE INVENTION

The present invention relates to an interfacing method and device for an image forming apparatus, and more particularly to a method and device for providing an interface for signals transmitted between an engine controller and a video controller in a printer.

With an image forming apparatus, such as a printer, electrical signals output from a personal computer (PC) are provided to the image forming apparatus to enable a printing operation. Typically, these electrical signals are provided to the image forming apparatus through an interface connecting the computer to the printer. This type of interface is disclosed in U.S. Pat. No. 5,157,761 entitled *Method And Apparatus For Interfacing A Thermal Printer* issued to Hawkes on 20 Oct. 1992. In particular, Hawke '761 strives to provide an interface having a strobe latch that enables the power requirements of the printer to be controlled.

In addition to interfaces between computers and printers, there is also a need to interface electrical signals transmitted between components within the image forming apparatus. For example, there is a need to interface signals transmitted between a video controller and an engine controller in an image forming apparatus using an electrophotographic printing method. The present invention is based on this latter type of interface, and in particular, seeks to provide an efficient and simplified method and device for interfacing signals between a video controller and an engine controller in an image forming apparatus.

SUMMARY OF THE INVENTION

Accordingly, it is an object of the present invention to provide an improved interfacing method and device in an image forming apparatus.

It is another object to provide a method and device for interfacing signals transmitted between an engine controller and a video controller in an image forming apparatus.

It is still another object to provide a method and device for interfacing signals transmitted between an engine controller and a video controller in an image forming apparatus that uses a reduced number of connection lines.

To achieve these and other objects, the present invention provides a method for interfacing electrical signals transmitted between an engine controller and a video controller through first and second transmission lines in an image forming apparatus. This method contemplates transmitting first data indicating an engine power ready state from the engine controller to the video controller through the first transmission line when power is initially supplied to the engine controller, transmitting second data representative of a print ready state from the engine controller to the video controller through the first transmission line after performing a warm up operation on the image forming apparatus, transmitting third data representing commencement of a printing operation from the video controller to the engine controller through the second transmission line in response to an input of printing data to the video controller from an external source, transmitting fourth data representative of a request for page synchronization information from the engine controller to the video controller through the first transmission line in response to receipt of the third data by the engine controller, and transmitting fifth data representative of the page synchronization information from the video controller to the engine controller through the second transmission line in response to receipt of the fourth data by the video controller. The engine controller performs the printing operation in response to the fifth data.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
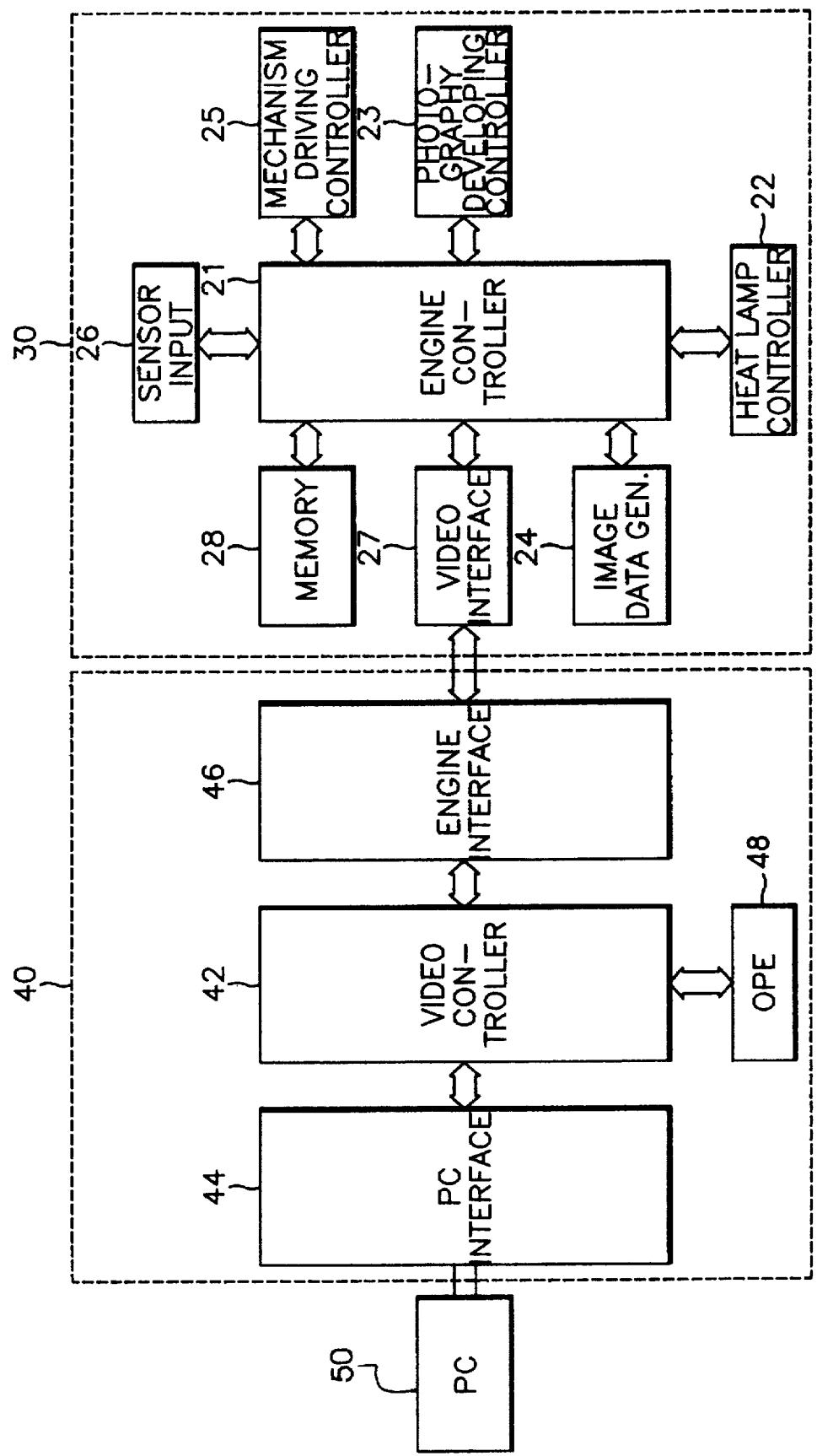
FIG. 1 is a block diagram illustrating a general image forming apparatus.

Turning now to the drawings and referring to FIG. 1, a block diagram of a general image forming apparatus is shown. The image forming apparatus of FIG. 1 includes an engine circuit 30, and a video control circuit 40 connected to a personal computer (PC) 50.

An engine controller 21 controls the operation of engine circuit 30 of the image forming apparatus. A heat lamp controller 22 is controlled by engine controller 21 and controls the fixing of developing material during an electrophotography process performed by the image forming apparatus. A photography developing controller 23 controls image development during the electrophotography process under the control of engine controller 21. An image data generation controller 24 is controlled by engine controller 21 and transmits image data. A mechanism driving controller 25 drives and controls operation of respective parts within the image forming apparatus in accordance with the control of engine controller 21. A sensor input 26 inputs signals sensed from respective sensors and then outputs the signals to engine controller 21. A video interface 27 provides an interface for signals transmitted between video control circuit 40 and engine circuit 30. A memory 28 stores a print control program and temporarily stores printing data. A personal computer (PC) interface 44 provides an interface for signals transmitted between personal computer (PC) 50 and video control circuit 40. A video controller 42 controls the flow of video data transmitted from personal computer (PC) interface 44. An engine interface 46 provides an interface for signals transmitted between engine circuit 30 and video control circuit 40. Operating panel equipment (OPE) 48, which is comprised of a plurality of keys for generating key data, provides key data to video controller 42 in response to key inputs. Operating panel equipment (OPE) 48 also includes a display device for displaying information regarding the operation of the image forming apparatus pursuant to the control of video controller 42.

Figure 2:
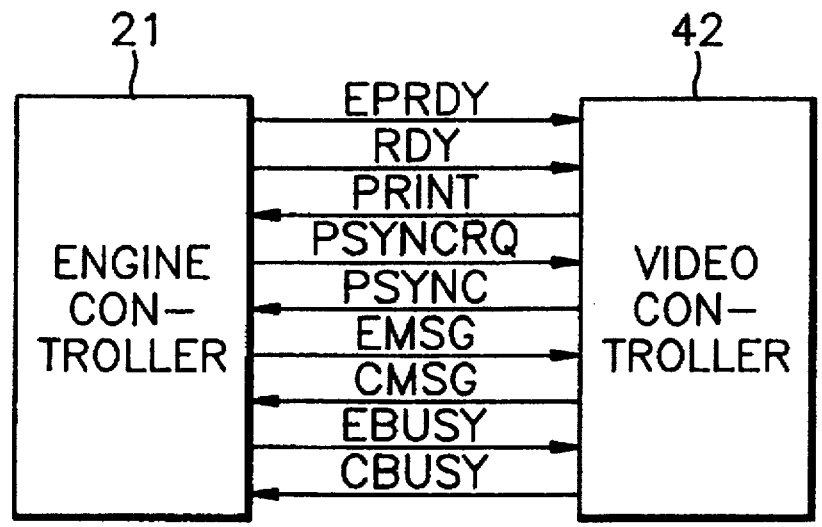
FIG. 2 is a diagram illustrating a connection of transmission lines for transmitting signals between the video controller and engine controller according to a conventional interfacing method.

Referring to FIG. 2, a diagram of the connections between video controller 42 and engine controller 21 through engine interface 46 and video interface 27 according to a conventional image forming apparatus is shown. A conventional interfacing method of an image forming apparatus will now be described with reference to FIGS. 1 and 2.

In the image forming apparatus employing the conventional interfacing method, a hardware connection is required to detect the inputs of an engine power ready signal EPRDY, a print signal PRINT, a page sync request signal PSYNCRQ, a page sync signal PSYNC, among other control signals. If the image forming apparatus is turned on, engine controller 21 activates the engine power ready signal EPRDY, and if no error occurs with the image forming apparatus after warming up, engine controller 21 activates the ready signal RDY indicating that engine controller 21 is ready to receive the print signal PRINT. At this time, video controller 42 outputs the print signal PRINT to engine controller 21, and engine controller 21 outputs the page sync request signal PSYNCRQ to video controller 42 to request page synchronization information. Video controller 42 then outputs the page sync signal PSYNC and starts to transmit data after the lapse of a predetermined time period, thus adjusting the top margin of the page. The connection between engine controller 21 and video controller 42 shown in FIG. 2 additionally includes an engine message transmission line EMSG, a control message transmission line CMSG, an engine busy line EBUSY and a control busy line CBUSY. As seen from the foregoing description, the image forming apparatus employing the conventional interfacing method has a problem in that a plethera of transmission lines are required to transmit signals between engine controller 21 and video controller 42, therefore causing the interface to be unduly complicated.

Figure 3:
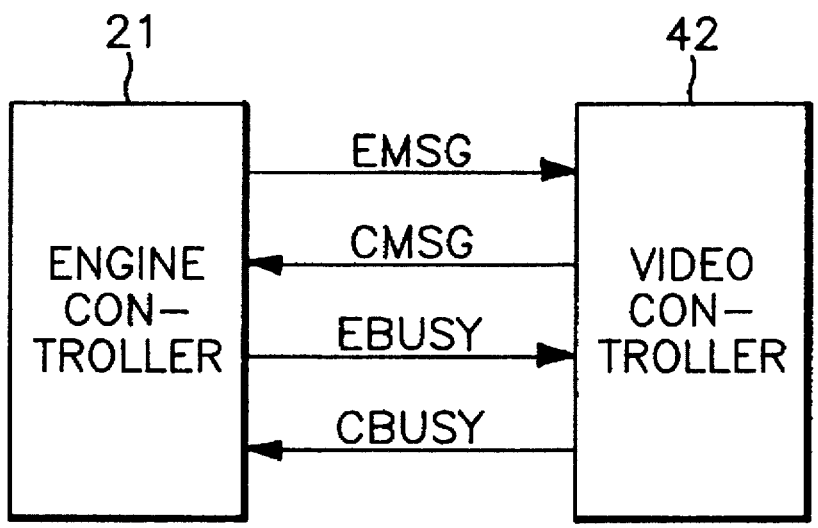
FIG. 3 is a diagram illustrating a connection of transmission lines for transmitting signals between the video controller and engine controller configured according to a preferred embodiment of the present invention.

Referring now to FIG. 3, a diagram of the connection of transmission lines between engine controller 21 and video controller 42 according to a preferred embodiment of the present invention is shown. Engine controller 21 and video controller 42 are connected through engine message transmission line EMSG for transmitting an engine message from engine controller 21 to video controller 42, control message transmission line CMSG for transmitting a video control signal from video controller 42 to engine controller 21, and engine busy line EBUSY and control busy line CBUSY for indicating the transmission states of the respective transmission lines.

The preferred embodiment of the present invention will now be described with reference to FIGS. 3 and 4.

The present invention transmits messages between engine controller 21 and video controller 42 via engine message transmission line EMSG and control message transmission line CMSG, without using a hardware interface for the engine power ready signal EPRDY, the ready signal RDY, the print signal PRINT, the page sync request signal PSYNCRQ, and the page sync signal PSYNC. That is, the present invention provides that these signals be represented as software codes.

In the preferred embodiment of the present invention, the engine power ready signal EPRDY, the ready signal RDY, the print signal PRINT, the page sync request signal PSYNCRQ and the page sync signal PSYNC are respectively defined as 0AH, 0BH, 0CH, 0DH and 0EH.

Figure 4:
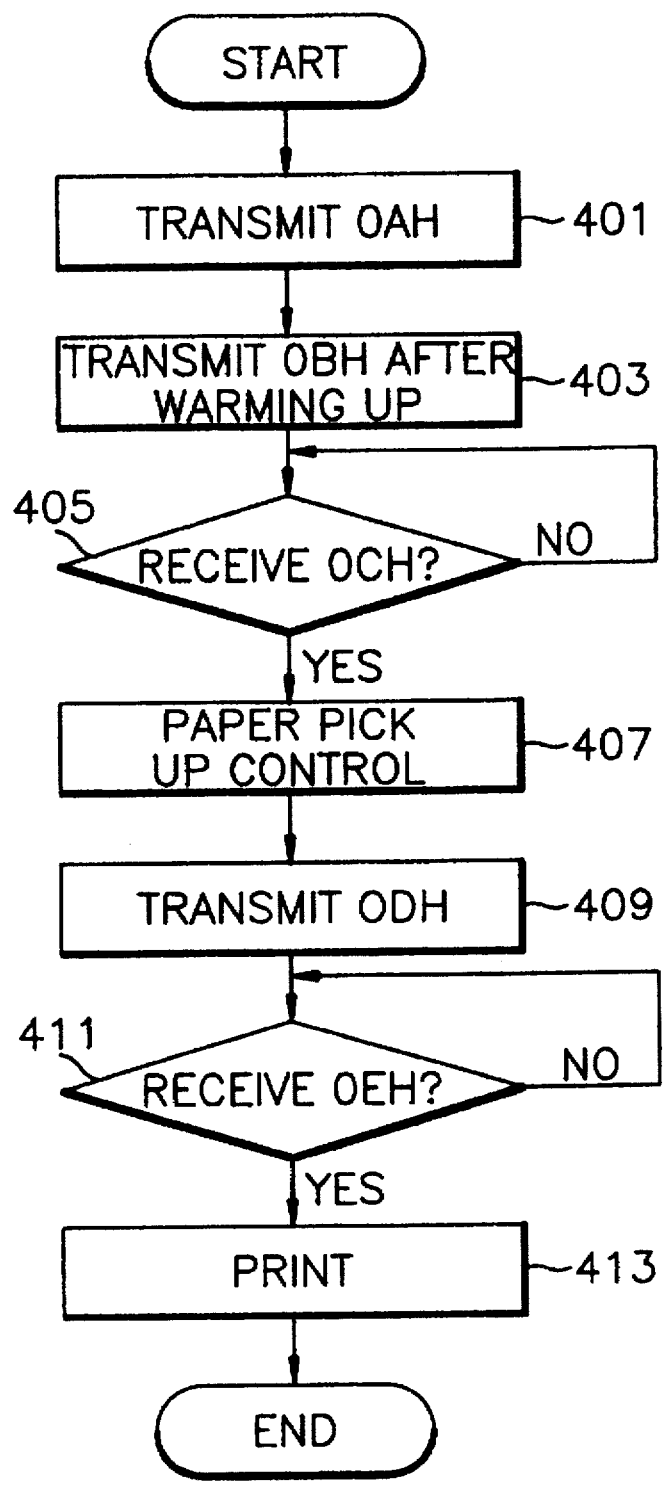
FIG. 4 is a flow chart illustrating the operations of the engine controller according to the preferred embodiment of the present invention.

Referring to FIG. 4, engine controller 21 transmits the data 0AH to video controller 42 through engine message transmission line EMSG, in step 401, when power is initially supplied to engine controller 21 to indicate an engine power up state. In step 403, if no errors are detected in the respective components of the engine connected to engine controller 21 and the image forming apparatus is warmed up, engine controller 21 transmits the data 0BH to video controller 42 through engine message transmission line EMSG to indicate that engine controller 21 is in a print ready state. In step 405, engine controller 21 detects whether or not the data 0CH indicating the printing state is received from video controller 42 through the control message transmission line CMSG. If the data 0CH is received in step 405, engine controller 21 controls mechanism driving controller 25 and picks up the paper in step 407. In step 409, engine controller 21 transmits the data 0DH to video controller 42 through the engine message transmission line EMSG to request the page synchronization information. If engine controller 21 receives the data 0EH representing the page synchronization information through the control message transmission line CMSG in step 411, engine controller 21 controls mechanism driving controller 25 and then performs the printing operation in step 413.

As described above, the present invention has an advantage in that a simplified interface for transmitting initial control commands between the engine controller and the video controller is provided by using only two transmission lines, rather than separate connection lines.

What is claimed is:

1. A method for interfacing electrical signals transmitted between an engine controller and a video controller connected through first and second transmission lines in an image forming apparatus, said method comprising the steps of:

transmitting first data indicating an engine power up state from said engine controller to said video controller through said first transmission line when power is initially supplied to said engine controller;

transmitting second data from said engine controller to said video controller through said first transmission line after performing a warm up operation on said image forming apparatus, said second data indicating that said engine controller is ready to enable performance of a printing operation;

transmitting third data from said video controller to said engine controller through said second transmission line in response to an input of printing data to said video controller from an external source, said third data indicating commencement of said printing operation;

transmitting fourth data from said engine controller to said video controller through said first transmission line in response to receipt of said third data by said engine controller, said fourth data indicating that said engine controller is requesting page synchronization information; and transmitting fifth data representative of said page synchronization information from said video controller to said engine controller through said second transmission line in response to receipt of said fourth data by said video controller, said engine controller enabling performance of said printing operation in response to said fifth data.

2. The method as claimed in claim 1, wherein said first and second transmission lines represent an engine message transmission line and a control message transmission line, respectively.

3. The method as claimed in claim 1, further comprised of transmitting first busy signals from said engine controller to said video controller through a third transmission line electrically connecting said engine controller to said video controller, said first busy signals indicating a transmission state of said first transmission line.

4. The method as claimed in claim 3, further comprised of transmitting second busy signals from said video controller to said engine controller through a fourth transmission line electrically connecting said video controller to said engine controller, said second busy signals indicating a transmission state of said second transmission line.

5. The method as claimed in claim 1, wherein said external source comprises a personal computer.

6. The method as claimed in claim 4, wherein said external source comprises a personal computer.

7. A method for interfacing electrical signals transmitted between an engine controller and a video controller connected through first and second transmission lines in an image forming apparatus, said method comprising the steps of:

transmitting a first signal from said engine controller to said video controller through said first transmission line after performing a warm up operation on said image forming apparatus, said first signal indicating that said engine controller is ready to enable performance of a printing operation;

transmitting a second signal from said video controller to said engine controller through said second transmission line in response to an input of printing data to said video controller from an external source, said second signal indicating commencement of said printing operation;

transmitting a third signal from said engine controller to said video controller through said first transmission line in response to receipt of said second signal by said engine controller, said third signal indicating that said engine controller is requesting page synchronization information; and transmitting a fourth signal representative of said page synchronization information from said video controller to said engine controller through said second transmission line in response to receipt of said third signal by said video controller, said engine controller enabling performance of said printing operation in response to said fourth signal.

8. The method as claimed in claim 7, further comprised of transmitting a first busy signal from said engine controller to said video controller through a third transmission line electrically connecting said engine controller to said video controller, said first busy signal indicating a transmission state of said first transmission line.

9. The method as claimed in claim 8, further comprised of transmitting a second busy signal from said video controller to said engine controller through a fourth transmission line electrically connecting said video controller to said engine controller, said second busy signal indicating a transmission state of said second transmission line.

10. The method as claimed in claim 7, wherein said external source comprises a personal computer.

11. The method as claimed in claim 9, wherein said external source comprises a personal computer.

12. A device for interfacing electrical signals between an engine controller and a video controller in an image forming apparatus, said device comprising:

a first transmission line for transmitting said electrical signals from said engine controller to said video controller, said first transmission line transmitting a first electrical signal from said engine controller to said video controller after performing a warm up operation on said image forming apparatus, said first electrical signal indicating that said engine controller is ready to enable performance of a printing operation;

a second transmission line for transmitting said electrical signals from said video controller to said engine controller, said second transmission line transmitting a second electrical signal from said video controller to said engine controller in response to an input of printing data to said video controller from an external source, said second electrical signal indicating commencement of said printing operation;

said first transmission line transmitting a third electrical signal from said engine controller to said video controller in response to receipt of said second electrical signal by said engine controller, said third electrical signal indicating that said engine controller is requesting page synchronization information; and said second transmission line transmitting a fourth electrical signal representative of said page synchronization information from said video controller to said engine controller in response to receipt of said third electrical signal by said video controller, said engine controller enabling performance of said printing operation in response to said fourth electrical signal.

13. The device as claimed in claim 12, further comprising:

a third transmission line electrically connecting said engine controller to said video controller for transmitting a fifth electrical signal from said engine controller to said video controller, said fifth electrical signal indicating a transmission state of said first transmission line.

14. The device as claimed in claim 13, further comprising:

a fourth transmission line electrically connecting said video controller to said engine controller for transmitting a sixth electrical signal from said video controller to said engine controller, said sixth electrical signal indicating a transmission state of said second transmission line.

15. The device as claimed in claim 12, wherein said external source comprises a personal computer.

16. The device as claimed in claim 14, wherein said external source comprises a personal computer.

* * * * *